Patented Jan. 19, 1932

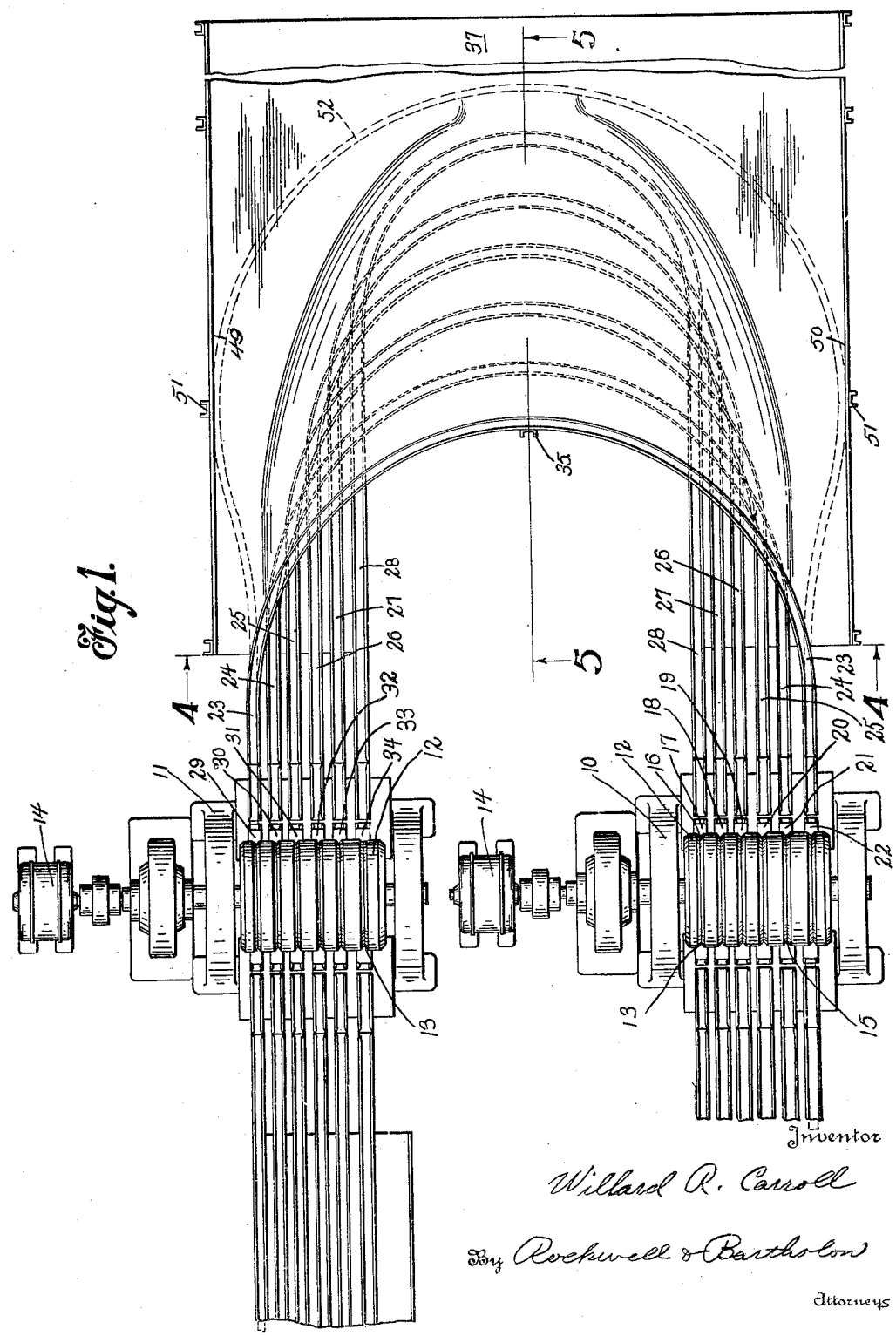

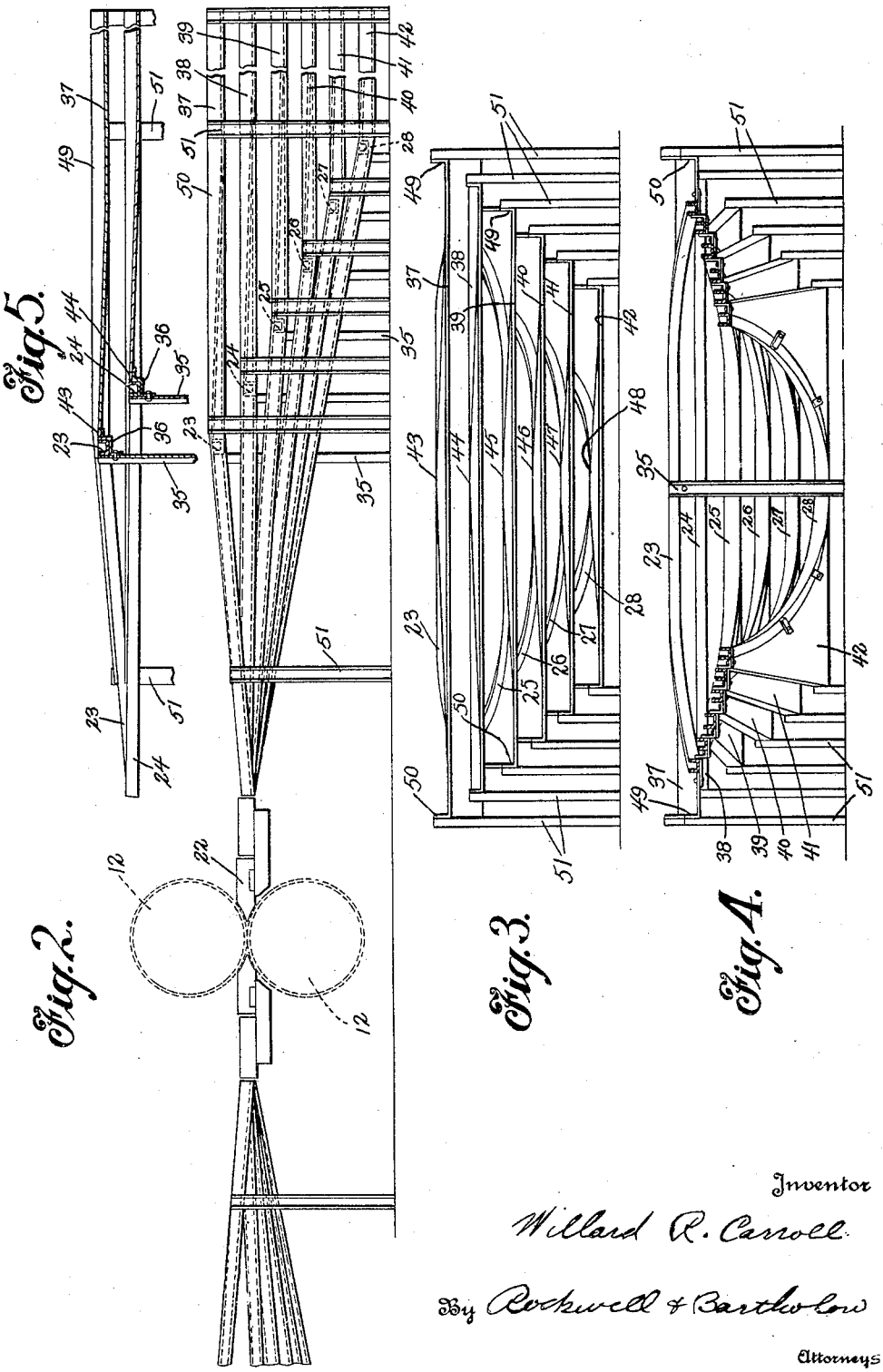

1,842,069

UNITED STATES PATENT OFFICE

WILLARD R. CARROLL, OF NEW HAVEN, CONNECTICUT, ASSIGNOR TO FARREL-BIRMINGHAM COMPANY, INCORPORATED, OF ANSONIA, CONNECTICUT

ROD MILL

Application filed May 25, 1929. Serial No. 366,005.

My invention relates to rod mills and more especially to rod mills wherein billets of metal are reduced by successive rolling operations to predetermined diameters and shapes.

The invention is primarily intended for use with mill stands for rolling rods of steel, copper, brass, aluminum, and other ductile metals, but certain features of the invention may be used to advantage in other connections.

My improvements are also primarily designed for use with rolling mills of the loop type having a number of units arranged for the simultaneous reduction of a rod or a number of rods fed through the units successively.

The usual rod mill comprises a number of individual rolling mills, each mill being provided with a pair of cooperating metal reducing rolls. Each pair of rolls is provided with oppositely disposed grooves forming a plurality of metal reducing passes, through which a plurality of rods may pass to be reduced. In what is termed a loop mill, the end of each billet or rod after it passes through one mill has to be directed to the next mill, where it is fed between the rolls of the mill to be further reduced. Owing to the reduction of the cross-sectional area of a rod as it passes through a mill, the reduced end of the rod leaves the mill at a greater speed than the rod enters the mill. As a result, the next mill must handle the rod at a greater speed in order that too much slack will not occur between mills. Owing to slippage and other causes, the amount of slack between adjacent mills is apt to vary. For this reason, and for the reason that it is desirable to permit the rods to cool between reducing operations, it is customary to conduct the rods from one mill to another in fairly long loops, which may vary considerably in length according to rolling conditions.

In the usual loop mill wherein a plurality of rods are simultaneously reduced, it is the practice to provide a pit through which the rods pass, generally in the form of lateral loops, from one mill to another. Several workmen are stationed in these pits for the purpose of keeping the several rods passing therethrough from becoming entangled, it being understood that the rods do not travel through a definite path but are constantly twisting and weaving about.

In practice, it is relatively impossible to prevent the rods from becoming entangled at times, with the result that the rolling operations have to be slowed down, the tangled rods cut away, and the new ends formed carried to the subsequent mills.

One object of the present invention is to meet the above conditions by providing an arrangement whereby a rod or a plurality of rods pass in looped form from one mill to another with a minimum amount of attention required on the part of the operator.

A further object of the invention is to provide an arrangement wherein a plurality of rods passing from one mill to another mill arranged at the side thereof may be looped, or more generally speaking, have considerable slackness, without there being any danger of the rods becoming entangled with one another.

A further object of the invention is to provide an arrangement having the above characteristics wherein the loops may vary considerably in length during the rolling, drawing, or such other operations as may be performed thereon, without any danger of their becoming entangled.

To these and other ends, the invention consists in the novel features and combination of parts to be hereinafter described and claimed.

In the drawings,

Fig. 1 is a plan view of a rod mill according to my invention;

Fig. 2 is a side elevation of the same;

Fig. 3 is an end view taken from the right-hand end of Fig. 1;

Fig. 4 is a sectional view along line 4—4 of Fig. 1; and

Fig. 5 is a sectional view along line 5—5 of Fig. 1.

Referring to the drawings in which I have illustrated my invention by showing a preferred embodiment of the same, the reference numerals 10 and 11 indicate a pair of rolling mills for the reduction of a plurality of rods, mills 10 and 11 being arranged in axial alignment and the rods passing from mill 10 to mill 11 in relatively wide loops, which are usually received in pits. Although the invention may be carried out with any usual type of mill, I have chosen to illustrate my invention in connection with the usual two-high mill, wherein each roll 12 is provided with a plurality of grooves 13, the grooves of each cooperating pair of rolls being disposed oppositely to one another and shaped to give the desired shape to the rod. Each mill may be driven by individual power means 14.

The rods pass into mill 10 at 15 and emerge at 16, passing through guides 17, 18, 19, 20, 21 and 22 and into troughs 23, 24, 25, 26, 27 and 28, which provide channels for guiding the rods to the next mill 11 of the series, where they pass through guides 29, 30, 31, 32, 33 and 34, and thence into the bite of the rolls of mill 11.

Preferably the guide trough or channel 23 connects the remote grooves 13 of mills 10 and 11, while troughs or channels 24, 25, 26, 27 and 28 connect successively the next adjacent grooves. In the particular form shown, trough 24 is substantially horizontal and trough 23 is somewhat upwardly inclined. Trough or channel 24 passes under trough 23, while the remaining troughs or channels 25, 26 and 27 are successively inclined downwardly from and pass under trough 24, and one another, each channel being spaced from and extending laterally beyond the adjacent higher channel at a lower level.

As shown in Fig. 2, the loop-shaped channels are arranged in planes which coincide at or adjacent the mouths of the rod-discharging guides of one mill and the rod-receiving guides of the other mill, and diverge from each other in a direction laterally away from the mills.

Troughs 23, 24, 25, 26, 27 and 28, inclusive, may be supported in any suitable manner, as for example, by means of channeled legs 35, on the upper ends of which are brackets 36 on which the troughs rest. Mounted on brackets 36 and conforming in shape to and abutting the adjacent edges of troughs 23 to 28, inclusive, are spaced substantially horizontal pans 37, 38, 39, 40, 41 and 42, the side edges of which beyond the troughs are substantially parallel and horizontal, while along their median lines the pans slope upwardly from their rear edges towards troughs 23, 24, 25, 26, 27, 28, until at 43, 44, 45, 46, 47 and 48 the forward edges of the pans are preferably even or flush with the upper edges of the troughs. Pans 37, 38, 39, 40, 41 and 42, inclusive, are provided on their side edges with flanges as, for example, flanges 49 and 50, by means of which the pans may be conveniently supported, as, for example, by means of channeled legs 51, which are secured to the flanges in any suitable manner. The edges of the pans where they abut the troughs are directed downwardly from points 43, 44, 45, 46, 47 and 48 towards the lower edges of the troughs until, adjacent the forward ends of the side margins of the pans, the abutting edges are substantially at the same level as the bottoms of the troughs (Figures 1 and 4).

After the rods have been guided from mill 10 to mill 11 by troughs or channels 23 to 28, inclusive, and upon any change in rolling conditions which increases the length of the loops, the rods may readily pass from the troughs or channels 23 to 28, inclusive, onto pans 37 to 42, inclusive, as shown in dotted lines in Fig. 1, which permit the rod loops 52 to expand or contract and to have considerable latitude in their movements without any danger, however, of the rods becoming entangled, owing to the fact that the pans prevent the rods from coming in contact with one another. The flanges 49 and 50 on the edges of the pans prevent the rod loops from moving off the pans. The pans not only act to receive and support the loops when they pass out of the troughs but to maintain the several loops at certain different respective elevations, regardless of their expansion or extension within wide limits, so that each loop is at all times unobstructed by the others.

It will be readily understood from the above description of the nature of the invention and the preferred embodiment for carrying out the same that I have provided an arangement wherein rods may pass through the successive units of a loop mill without the usual attention necessary to conduct the rods from one unit to another, and to keep them separated. As a result, it will be readily understood that the rolling or other operations may be speeded up as a whole, and that the usual delays and waste incidental to cutting away entangled rods are entirely eliminated, while the number of workmen required may be substantially reduced.

Each trough or guide channel forms a means for guiding the end of the rod automatically from one mill to another in loop form, and the associated table or pan body effectively supports the rod when it rides or jumps out of the curved guide. Thus the rod supporting structure not only guides the rod end for automatic transfer from one mill to another but provides an effective means for preventing entanglement of the rods when the loops in lengthening leave the guide channels.

It will be observed that all of the guide channels for the loops are substantially U-shaped in plan, and that in the case illustrated some of the channels have their legs or branches more closely spaced than others, although on the other hand, the former channels are longer, i. e., the height of the U is greater. In the form shown, the widest U is uppermost and the lower ones are successively narrower and longer as the bottom of the structure is approached; but this arrangement is susceptible of various modifications and is not essential in all cases. The rods are closer together where they leave one mill and where they enter another than they are at an intermediate point between the mills. The upwardly inclined median portion of the pan provides a gentle slope over which the middle portion of the loop readily passes.

While I have shown mills arranged in axial alignment, it will be readily understood that the invention is not limited to this arrangement of mills, but may be carried out in connection with such other arrangements of the individual mills as may be desirable to suit individual installations.

While I have shown and described a preferred embodiment of my invention, it will be understood that it is not to be limited to all the details shown, but is capable of modification and variation within the spirit of the invention and the scope of the appended claims.

What I claim is:

1. In a rod mill, a pair of mills adapted to act successively on a plurality of rods, and means for guiding said rods independently from one of said mills to the other, said guiding means including a plurality of channeled members leading from one of said mills to the other, the channels being curved intermediate their ends and said channel members being vertically spaced from one another adjacent the curved portions of the channels.

2. In a rod mill, a pair of mills adapted to act successively on a plurality of rods, means for guiding the ends of the rods from one of said mills to the other, and means for supporting the rods out of contact with one another during their passage between the mills, said supporting means being arranged to permit variations in the length of the rods between the mills when supported thereon.

3. In a rod mill, a pair of mills adapted to act successively on a plurality of rods, means for guiding the ends of the rods independently from one mill to the other, the rods between the mills being in the form of loops, and means adjacent said guiding means upon which the loops may move upon any increase in the length of the latter, said last named means comprising a plurality of relatively wide substantially flat supporting elements.

4. In a rod mill, a pair of mills adapted to act successively on a plurality of rods, the rods being in the form of loops between the mills, a plurality of relatively wide substantially flat supporting elements for the loops, said supporting elements being arranged in spaced vertical relation, and loop-like guiding elements on the supporting elements through which the ends of the rods pass from one mill to the other.

5. In a rod mill, a pair of mills adapted to act successively on a plurality of rods, means for guiding said rods in the form of loops independently from one mill to the other, and means adjacent said guiding means upon which said loops may move upon any increase in the length of the latter, said last named means comprising a plurality of substantially flat pans arranged in spaced vertical relation, each of said pans being provided with an upper rod supporting face which slopes upwardly from the sides thereof towards a point adjacent a central point of the adjacent guiding means.

6. In a rod mill, a pair of mills adapted to act successively on a plurality of rods, means for guiding said rods in the form of loops independently from one mill to the other, and means adjacent said guiding means upon which said loops may move upon any increase in the length of the latter, said last named means comprising a plurality of substantially flat pans arranged in spaced vertical relation, each of said pans being provided with an upper rod supporting face which slopes upwardly from the sides thereof towards a point adjacent a central point of the adjacent guiding means, and flanges on the side edges of said pans.

7. In a rod mill of the loop type, the combination with a mill, of curved open guides to transfer the rods automatically from said mill to the next mill in loop form, and means to maintain the loops in different planes when they lengthen and escape from the guide.

8. In a rod mill, the combination of a rolling mill to roll a plurality of rods simultaneously, a plurality of curved guides to transfer the rods in loop form from said mill to the next mill, and means to maintain the loops in different planes and out of contact with each other when they lengthen and escape from the guides.

9. In a rod mill, the combination with a plurality of mills to reduce a plurality of rods simultaneously, of a plurality of loop guides for transferring the rods from one mill to another, arranged in planes which diverge laterally from the mill rolls.

10. In a rod mill, the combination with a plurality of mills to reduce a plurality of rods simultaneously, of a plurality of loop guides for transferring the rods from one mill to another, arranged in planes which diverge laterally from the mills, the intermediate portions of said guides being located at different elevations.

11. In a rod mill, the combination with a plurality of mills to reduce a plurality of rods simultaneously, of a plurality of loop guides for transferring the rods from one mill to another, arranged in planes which diverge laterally from the mills, the intermediate portions of said guides being located at different elevations, and substantially flat loop-supporting elements associated with the respective guides at the sides thereof which are remote from the mills.

12. In a rod mill, the combination with adjacent axially aligned mills for reducing a plurality of rods simultaneously, of curved guide channels for the loops located in planes which diverge laterally from the mills so that the intermediate portions of the channels are at different elevations, said intermediate portions being located in different vertically spaced planes.

13. In a rod mill, the combination with axially aligned rolling mills to reduce a plurality of rods simultaneously, of curved loop guides arranged in different planes and located one above the other, said guides being of substantially U-form and the U's being successively narrower toward the bottom of the series.

14. In a rod mill, the combination with rolling mills to reduce a plurality of rods simultaneously, of curved loop guides arranged in different planes and located one above the other, said guides being of substantially U-form and the U's being successively narrower and longer.

15. In a rod mill, the combination with rolling mills to reduce a plurality of rods simultaneously, of curved loop guides arranged in different planes and located one above the other, said guides being of substantially U-form and the U's being successively narrower and longer toward the bottom of the series.

16. In a rod mill, the combination with rolling mills to reduce a plurality of rods simultaneously, of curved channel loop guides arranged in different planes and located one above the other, said guides being of substantially U-form and the widest U being uppermost and the U's being successively narrower and longer toward the bottom of the series, and substantially horizontal pans spaced vertically from each other and associated with the respective guides at the sides thereof remote from the mills.

17. In a rod mill, the combination with a pair of mills adapted to act successively on a plurality of rods, of means for guiding the rods independently from one of said mills to the other in the form of loops which are out of contact with one another, and means for subsequently maintaining the loops out of contact with one another upon any increase in the length thereof.

In witness whereof, I have hereunto set my hand this 24th day of May, 1929.

WILLARD R. CARROLL.